(12) United States Patent
Hauviller et al.

(10) Patent No.: US 9,875,446 B2
(45) Date of Patent: Jan. 23, 2018

(54) TRAVEL PRODUCT INFORMATION SHARING

(71) Applicant: Amadeus S.A.S., Sophia Antipolis (FR)

(72) Inventors: Nicolas Hauviller, Valbonne (FR); Francois Montegut, Nice (FR); Rudy Daniello, Nice (FR)

(73) Assignee: Amadeus S.A.S., Biot (FR)

( * ) Notice: Subject to any disclaimer, the term of this patent is extended or adjusted under 35 U.S.C. 154(b) by 747 days.

(21) Appl. No.: 14/244,189

(22) Filed: Apr. 3, 2014

(65) Prior Publication Data
US 2015/0286959 A1   Oct. 8, 2015

(51) Int. Cl.
G06Q 10/02 (2012.01)
G06Q 30/06 (2012.01)

(52) U.S. Cl.
CPC ......... *G06Q 10/02* (2013.01); *G06Q 30/0623* (2013.01); *G06Q 30/0631* (2013.01)

(58) Field of Classification Search
CPC . G06Q 10/02; G06Q 30/0623; G06Q 30/0631
USPC .......................................................... 705/5
See application file for complete search history.

(56) References Cited

U.S. PATENT DOCUMENTS

| 7,058,626 | B1 * | 6/2006 | Pan ................... G06F 17/30669 |
| 7,933,955 | B2 | 4/2011 | Khalatian |
| 2002/0099829 | A1 * | 7/2002 | Richards ........... G06F 17/30899 709/227 |
| 2004/0253991 | A1 | 12/2004 | Azuma |
| 2006/0031779 | A1 | 2/2006 | Theurer et al. |
| 2008/0201178 | A1 * | 8/2008 | Vizitei .............. G06F 17/30867 705/5 |
| 2010/0174783 | A1 * | 7/2010 | Zarom .................... G06F 9/526 709/205 |

(Continued)

FOREIGN PATENT DOCUMENTS

WO   WO 2012004599 A1 *   1/2012   .......... G06Q 10/101

OTHER PUBLICATIONS

Vivion, N. (Nov. 11, 2013). "Startup pitch: ShareTrips drops collaboration tools into the hotel booking process." tnooz. Retrieved from https://www.tnooz.com/article/sharetrips-drops-collaboration-tools-hotel-booking-process-sharing-friends/.*

(Continued)

*Primary Examiner* — George Chen
*Assistant Examiner* — Bryan Kirk
(74) *Attorney, Agent, or Firm* — Thompson Hine LLP

(57) ABSTRACT

Methods, systems, and computer program products that enable a travel agent to selectively share information related to a plurality of travel products with a traveler. In response to a search query from the travel agent, an information sharing module receives information relating to the plurality of travel products from a travel database system. The information sharing module causes the information to be displayed to a travel agent on a first display of a travel agency system. In response to the travel agent selecting a subset of the travel products, the information sharing module displays information relating to the subset of travel products to the traveler on a second display separate from the first display. The information sharing module may be configured to reformat the information so that the information is adapted to the traveler, and to cause travel products selected by the traveler to be booked.

16 Claims, 14 Drawing Sheets

(56) References Cited

U.S. PATENT DOCUMENTS

| | | | |
|---|---|---|---|
| 2010/0299616 A1* | 11/2010 | Chen | G06Q 10/10 |
| | | | 715/753 |
| 2014/0025744 A1* | 1/2014 | Kim | G06F 3/1454 |
| | | | 709/204 |
| 2014/0195525 A1* | 7/2014 | English | G06F 17/30873 |
| | | | 707/722 |

OTHER PUBLICATIONS

About See Your Travel Agent retrieved from http://www.seeyourtravelagent.com/show_content.php?page=5 [retrieved on Jul. 7, 2014].

* cited by examiner

```
AN15FEBPARBRU  -MD-   (1A)
** AMADEUS AVAILABILITY - AN **  BRU BRUSSELS.BE                         149 SA 15FEB 0000
* 1KL:AF8234   J7 C5 D5 Z5 Y9 B9 M9 /CDG2F AMS    1440   1555  E0/73H    3:05
               U9 K9 H9 L9 Q9 T9 E9 N9 R9 V2 X2
   *KL1731     J6 C6 D6 I4 Z6 Y9 B9 /AMS    BRU   1655   1745  E0/F70
               M9 U9 K9 H9 L9 Q9 T9 E9 N2 R2 V2
  2 KL1234     J9 C5 D5 Z5 W9 S9 A9 /CDG2F AMS    1440   1555  E0/73H    3:05
               Y9 B9 M9 U9 K9 H9 L9 Q9 T9 E9 N9 R9 V7 G9
   *KL1731     J6 C6 D6 I4 Z6 Y9 B9 /AMS    BRU   1655   1745  E0/F70
               M9 U9 K9 H9 L9 Q9 T9 E9 N2 R2 V2
 **3 7S1210    C9 DL Y9 BL KL HL G9 /CDG2F AMS    0900   1015  E0/321    3:08
     2H9334    P9 F9 A9 J9 C9 D9 I9     AMS ZYR   1040   1158  E2.TRN
               Z9 W9 S9 Y9 B9 H9 K9 L9 M9 N9 Q9 T9
  4 8X 406     C9 J9 D9 I9 U9          /CDG FRA   1830   1930  E0/737    3:05
    LH1024     J9 C9 D9 Z9 P9 I9 R9    /FRA 1 BRU 2040   2140  E0/320
```

FIG. 12

Mr SMITH, merci de sélectionner votre option de transport préférée pour le 15 Février 2014 de Paris à Bruxelles

| | Compagnie | Départ | Arrivée | Lieu de départ | Lieu d'arrivée | Equipement |
|---|---|---|---|---|---|---|
| 1 | KLM Royal Dutch | 14H40 | 15H55 | Aéroport Paris Charles de Gaule Terminal 2F | Aéroport Amsterdam Schiphol | BOEING 737-800 |
| | KLM Royal Dutch | 16H55 | 17H45 | Aéroport Amsterdam Schiphol | Aéroport de Bruxelles | FOKKER 70 |

Connexion à Amsterdam

Durée totale du trajet : 3H05min

| | Compagnie | Départ | Arrivée | Lieu de départ | Lieu d'arrivée | Equipement |
|---|---|---|---|---|---|---|
| 2 | Amadeus Airlines | 09H00 | 10:15 | Aéroport Paris Charles de Gaule Terminal 2F | Aéroport Amsterdam Schiphol | Airbus A321 |
| | Thalys International | 10H40 | 11H58 | Aéroport Amsterdam Schiphol | Gare de Bruxelles-Midi | Train |

Connexion à Amsterdam

Durée totale du trajet : 2H58min

FIG. 13

Mr SMITH, please select your preffered travel option for your trip on 15th of February 2014 from Paris to Brussels

| | Carrier | Departure | Arrival | Departure Location | Arrival Location | Equipment |
|---|---|---|---|---|---|---|
| 1 | KLM Royal Dutch | 14H40 | 15H55 | Paris Charles de Gaule Airport Terminal 2F | Amsterdam Schiphol Airport | BOEING 737-800 |
| | KLM Royal Dutch | 16H55 | 17H45 | Amsterdam Schiphol Airport | Brussels Airport | FOKKER 70 |

Connection in Amsterdam

Total trip duration: 3H05min

| | Carrier | Departure | Arrival | Departure Location | Arrival Location | Equipment |
|---|---|---|---|---|---|---|
| 2 | Amadeus Airlines | 09H00 | 10:15 | Paris Charles de Gaule Airport Terminal 2F | Amsterdam Schiphol Airport | Airbus A321 |
| | Thalys International | 10H40 | 11H58 | Amsterdam Schiphol Airport | Brussels-South Railway station | Train |

Connection in Amsterdam

Total trip duration: 2H58min

FIG. 14

TRAVEL PRODUCT INFORMATION SHARING

BACKGROUND

The invention generally relates to computers and computer software and, in particular, to methods, systems, and computer program products for displaying travel information to, and interacting with, the traveler for booking travel products.

Travel agents typically access computer reservation systems or other travel product related systems to search for and plan travel itineraries for travelers. Computer reservation systems typically include one or more databases that store and retrieve information on travel product cost and availability. Computer reservation systems may also conduct transactions related to booking air, rail, shuttle, or bus travel, hotel rooms, rental cars, and other travel products. A system configured to book reservations for multiple travel product providers is commonly referred to as a Global Distribution System (GDS). A GDS is typically operated by a third party service provider. Third party service providers may offer GDS services that connect travel product provider systems to travel agency systems. The GDS may thereby enable travel agents to search for and sell travel products offered by multiple travel product providers.

During the process of selling travel products to a traveler in a face-to-face situation, the travel agent may request that the traveler decide on certain aspects of the itinerary. For example, the traveler may need to decide which flight, hotel, or other travel-related services they want to book for the trip. If the traveler is physically present in the travel agent's office, the travel agent will often point their display toward the traveler so that the traveler can directly view the travel information. However, the data displayed by a travel agency system is often cryptic in nature and not well adapted to interpretation by the traveler. For example, certain information may be provided using codes and industry specific language or jargon that is not understandable by the traveler. This information may be presented over a command line interface unsuited for viewing by travelers. Moreover, the travel agency system may also display confidential information, such as commissions, margins, or discounted prices that should not be disclosed to the traveler.

Thus, improved systems, methods, and computer program products for displaying information relating to travel products are needed that enable travelers to view and comprehend the information being displayed.

SUMMARY

In an embodiment of the invention, a method of providing travel information to a traveler is provided. The method includes displaying first travel information relating to a plurality of travel products on a first display associated with a travel agent, and receiving input defining a subset of the travel products selected by the travel agent for sharing with the traveler. The method further comprises causing second travel information relating to the travel products in the subset to be displayed on a second display, wherein the second travel information excludes the first travel information relating to the travel products that are not part of the subset.

In another embodiment of the invention, an apparatus for providing the travel information to the traveler is provided. The apparatus includes the first display, one or more processors coupled to the first display, and a memory coupled to the processor. The memory includes instructions that, when executed by the processor, cause the apparatus to display first travel information relating to the plurality of travel products on the first display, and receive input defining the subset of the travel products selected by the travel agent for sharing with the traveler. The instructions may further cause the apparatus to prepare the second travel information relating to the travel products in the subset for transmission to the second display, wherein the second travel information excludes the first travel information relating to the travel products that are not part of the subset.

In another embodiment of the invention, a computer program product is provided that includes a non-transitory computer readable storage medium including the instructions. The instructions may be configured, when executed by a processor, to cause the processor to display the first travel information relating to the plurality of travel products on the first display, and receive the input defining the subset of the travel products selected by the travel agent for sharing with the traveler. The instructions may further cause the processor to prepare the second travel information relating to the travel products in the subset for transmission to the second display, wherein the second travel information excludes the first travel information relating to the travel products that are not part of the subset.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 12 is a diagrammatic view of a screen depicting exemplary travel information displayed to the travel agent.

FIG. 13 is a diagrammatic view of a screen depicting shared travel information being displayed to the traveler in a first language.

FIG. 14 is a diagrammatic view of a screen depicting the shared travel information from FIG. 13 displayed to the traveler in a second language.

DETAILED DESCRIPTION

Embodiments of the invention are directed to systems and methods for sharing travel related information, such as flights, hotels, rental cars, and other travel products, interactively with travelers booking travel with the assistance of a travel agent. These systems and methods may also facilitate booking of a travel product about which information is being shared. These systems and methods may be implemented by a computing system comprising one or more networked computers or servers that provide processing and database functions for travel related systems. The traveler may be located at a ticketing office, such as a travel agency or service provider office, or may be remotely located while online with a call center associated with the travel agency or travel service provider, such as an airline, hotel, or rail carrier. In any case, the traveler may view shared travel information selected by the travel agent via a separate computer screen, tablet computer, smart phone, wearable computers such as connected smart glasses or smart watches, or any other suitable computing device separate from that used by the travel agent.

To this end, an information sharing module may be configured to enable the travel agent to search for and receive travel product information from a travel database system. The information sharing module may be further configured to allow the travel agent to select which information returned from the travel database system to display to the traveler. The travel agent may thereby control what information is presented to the traveler. The travel agent may view one set of information on a display dedicated to their use, while the traveler views information selected by the travel agent on a separate display dedicated to the traveler.

The traveler display may be located in the same office as the agent display, and may be a second display facing the customer area at the travel agency office. The travel agent may also supply the traveler with a tablet computer or other device to allow the traveler to view information while working with the agent to book travel. The traveler display may also be located remotely. For example, the traveler may use a personal computer to view travel information provided by the agent via the Internet while on the phone with the agent. Travel information deemed relevant by the agent may thereby be displayed to the traveler on a separate screen and may be specifically formatted for the traveler by the information sharing module. The information sharing module may thereby allow the travel agent to control what the traveler sees on the traveler's display, and may improve the ability of the traveler to understand the information being shared.

Figure 1:
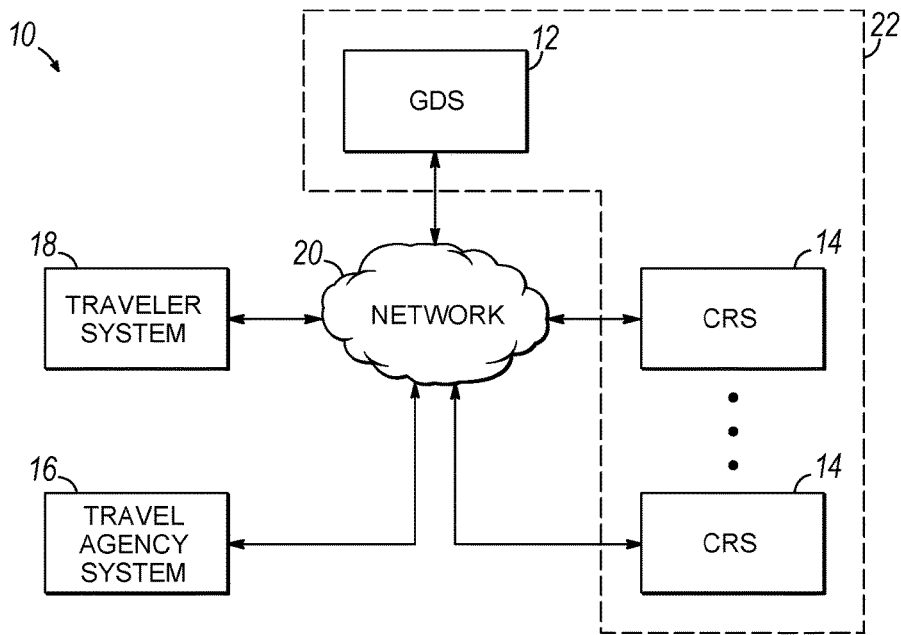
FIG. 1 is a diagrammatic view of an exemplary operating environment including a travel agency system, a traveler system, and a travel database system in communication via a network.

Referring now to FIG. 1, an operating environment 10 in accordance with an embodiment of the invention may include a Global Distribution System (GDS) 12, a plurality of Computer Reservation Systems (CRSs) 14, a travel agency system 16, and a traveler system 18. Each of the GDS 12, CRSs 14, travel agency system 16, and traveler system 18 may communicate through a network 20. Each CRS 14 may enable the GDS 12 and/or travel agency system 16 to search for, reserve, and pay for travel products sold by a corresponding travel product provider. The network 20 may include one or more private and/or public networks (e.g., the Internet) that enable the exchange of data.

The GDS 12 may be configured to facilitate communication between the CRSs 14 and travel agency systems 16 by enabling travel agents to search for available travel products, such as flights, hotel rooms, etc., and book reservations on one or more CRSs 14 via the GDS 12. To this end, the GDS 12 may maintain links to each of the CRSs 14 via the network 20. These links may allow the GDS 12 to obtain scheduling and availability data for travel products from the CRSs 14, and send booking requests to the CRSs 14. The GDS 12 and CRSs 14 may thereby collectively provide a travel database system 22 that enables the travel agency system 16 to search for and book flights, trains, hotel rooms, rental cars, or any other suitable travel products from multiple travel product providers via a single connection to the GDS 12.

The travel agency system 16 may include a web server that provides a publicly accessible website. This website may be configured to provide access to travel planning features, such as the ability to be shown travel products. To this end, the travel agency system 16 may provide the traveler system 18 with data from one or more databases hosted by the GDS 12, CRSs 14, and travel agency system 16. In an alternative embodiment of the invention, the travel agency system 16 may be a proprietary system that limits access to travel product providers or travel agents, in which case access may be provided through a private website or other application.

The traveler system 18 may comprise any suitable computing system configured to communicate over the network 20. For example, the traveler system 18 may comprise a desktop, laptop, or tablet computer, a smart phone, wearable computer such as smart glasses or smart watch, or any other computing device that enables the traveler to communicate over the network 20. The traveler system 18 may also include a web-browser or other suitable application that communicates with a web-server or other suitable application hosted by the travel agency system 16. The travel agency system 16 may also include one or more applications to enable the travel agency system 16 obtain data relating to travel products from the GDS 12 or CRSs 14.

The traveler system 18 may be owned by the traveler and communicate to the travel agency system 16 through the network 20, or may be a system provided by the travel agency, such as a terminal in a kiosk or at the travel agency office, or a computing device provided to the traveler appearing in person at the travel agency office. The network 20 may include one or more local area networks and/or public networks such as the Internet. For example, the travel agency office may include a wireless access point so that the traveler system 18 can communicate with the travel agency system 16 while the traveler is physically present at the travel agency. In an alternative embodiment of the invention, the travel agency system 16 may include multiple displays connected to the travel agency system 16. In this embodiment, during an information sharing session, one display may be directed to the travel agent, and the other display may be directed to the traveler. This could be the case, for example, when the traveler is physically present in the travel agency office and located across a counter or desk from the travel agent.

Figure 2:
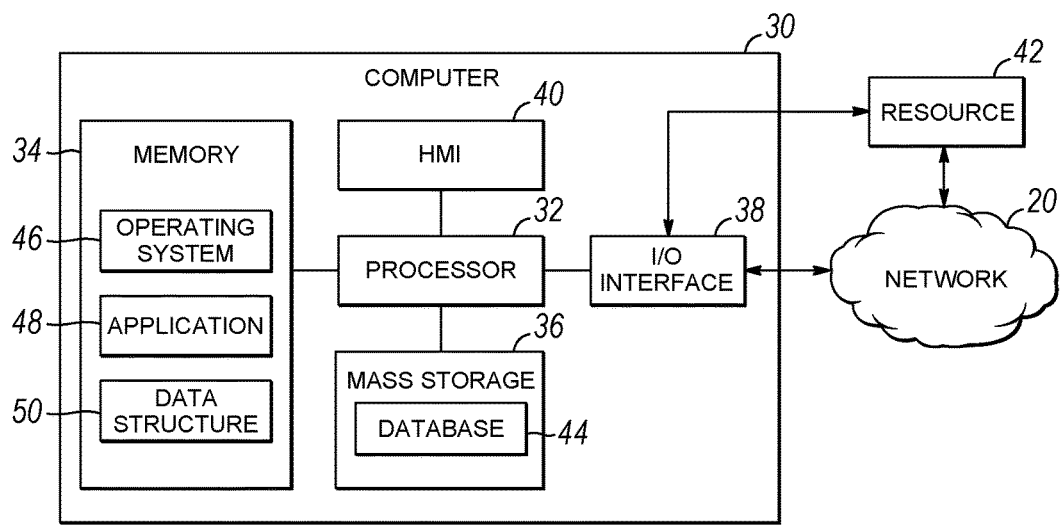
FIG. 2 is a diagrammatic view of an exemplary computing system of FIG. 1.

Referring now to FIG. 2, the GDS 12, CRSs 14, travel agency system 16, and traveler system 18 of operating environment 10 may be implemented on one or more computing devices or systems, referred to collectively as a computer, such as computer 30. The computer 30 may include a processor 32, a memory 34, a mass storage memory device 36, an input/output (I/O) interface 38, and a Human Machine Interface (HMI) 40. The computer 30 may also be operatively coupled to one or more external resources 42 via the network 20 and/or I/O interface 38. External resources may include, but are not limited to, servers, databases, mass storage devices, peripheral devices, cloud-based network services, or any other suitable computing resource that may used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 44 may reside on the mass storage memory device 36, and may be used to collect and organize data used by the various systems and modules described herein.

Processor 32 may operate under the control of an operating system 46 that resides in memory 34. The operating system 46 may manage computing resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, and/or application 48 to store or manipulate data.

The I/O interface 38 may provide a machine interface that operatively couples the processor 32 to other devices and systems, such as the network 20 and/or external resource 42. The application 48 may thereby work cooperatively with the network 20 and/or external resource 42 by communicating via the I/O interface 38 to provide the various features, functions, applications, processes, and modules comprising embodiments of the invention.

The application 48 may also have program code that is executed by one or more external resources 42, or otherwise rely on functions and signals provided by other system or network components external to the computer 30. Indeed, given the nearly endless hardware and software configurations possible, persons having ordinary skill in the art will understand that embodiments of the invention may include applications that are located externally to the computer 30, distributed among multiple computers or other external resources 42, or provided by computing resources (hardware and software) that are provided as a service over the network 20, such as a cloud computing service. Applications may be hosted on one or more of the systems 12, 14, 16, 18 to provide modules, functions, and processes used to implement embodiments of the invention.

The HMI 40 may be operatively coupled to the processor 32 of computer 30 in a known manner to allow a user of the computer 30 to interact directly with the computer 30. The HMI 40 may include video and/or alphanumeric displays, a touch screen, a speaker, or any other suitable audio and visual indicators capable of providing information to the user. The HMI 40 may also include input devices and controls such as an alphanumeric keyboard, a pointing device, keypads, pushbuttons, control knobs, microphones, the aforementioned touch screen (which may provide a gesture based user interface), etc., capable of accepting commands or input from the user and transmitting the entered input to the processor 32.

Figure 3:
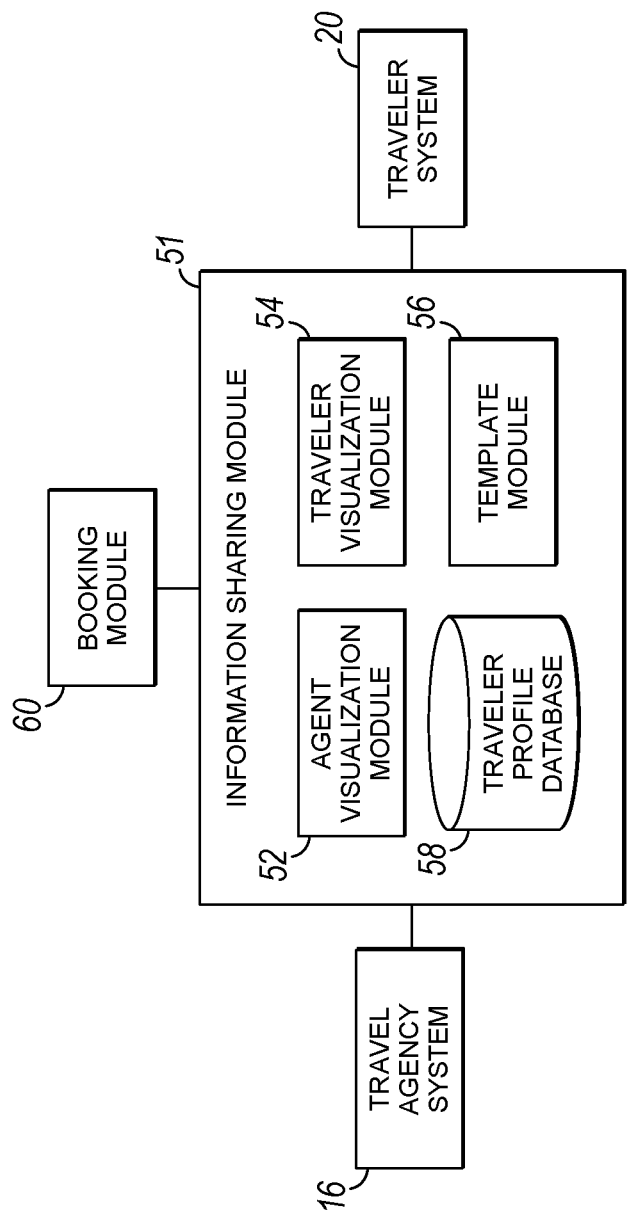
FIG. 3 is a schematic view of an information sharing module for sharing information between the travel agency system and traveler system of FIG. 1.

Referring now to FIG. 3, an information sharing module 51 may be provided by one or more of the applications 48, which may be hosted on the GDS 12, travel agency system 16, and/or traveler system 18. The information sharing module 51 may include an agent visualization module 52, a traveler visualization module 54, a template module 56, and a traveler profile database 58. The information sharing module 51 may be in communication with a booking module 60, which may reside on the GDS 12, CRSs 14, or travel agency system 16. The information sharing module 51 may enable the information sharing session between the travel agency system 16 and traveler system 18. The information sharing session may be initiated by either the travel agent or the traveler.

For example, the travel agent may send a session request to the traveler system 18, such as an e-mail or instant message containing an embedded link that can be activated by the traveler to initiate the information sharing session. The traveler may also initiate the information sharing session, such as by clicking on a specific Uniform Resource Locator (URL), scanning a Quick Response (QR) code, or scanning a Near Field Communication (NFC) device. In an embodiment of the invention, activating the URL, scanning the QR code, or scanning the NFC device may launch the information sharing module 51 or a portion thereof. For example, scanning the QR code may launch an application that loads a specific website based on data embedded in the QR code. In any case, persons having skill in the art will understand that the information sharing session may be initiated in any number of ways, and that embodiments of the invention are not limited to any particular method of initiating the information sharing session.

The agent visualization module 52 may provide a user interface for displaying travel information to the travel agent. The user interface provided by the agent visualization module 52 may also enable the travel agent to query the travel database system 22 for travel products meeting desired criteria. In response to receiving travel product information from the travel database system 22, the agent visualization module 52 may display the travel product information to the travel agent. The travel agent may then select one or more of the displayed travel products, and have the selected travel products displayed to the traveler by the traveler visualization module 54. The agent visualization module 52 may also provide the travel agent with a lockout function that disables the traveler's ability to select or book the displayed travel products so that the travel agent maintains control over which travel products are booked. The lockout function may thereby allow the travel agent to share information with the traveler in a read-only or "display mode". The travel agent may also unlock the information displayed to the traveler to allow the traveler to book travel in an "interaction mode". The lockout function may also provide the travel agent with the ability to selectively allow the traveler to obtain additional information on displayed travel products. In an embodiment of the invention, the lockout function may be limited to just locking shared information provided by the travel agent. This may enable the traveler to obtain additional information from external sources, such as third party travel web sites, even though the travel information provided by travel agent is locked out.

The traveler visualization module 54 may provide a user interface for displaying travel information to the traveler. The traveler visualization module 54 may be configured to allow the traveler to select a displayed travel product and receive additional information on the product from either the travel database system 22 or other external systems. For example, if the travel agent selects three hotels to share with the traveler using the agent visualization module 52, the traveler visualization module 54 may receive and display information relating to the three hotels to the traveler. In response to the traveler selecting one of the hotels, the traveler visualization module 54 may obtain and display additional data related to the hotel, such as ratings or photos from web sites accessible through the Internet. The traveler visualization module 54 may also be configured to reformat information presented by the agent visualization module 52 so that the information is more understandable to the traveler. For example, the traveler visualization module 54 may translate industry terms, codes, and acronyms displayed by the agent visualization module 52 into terms more familiar to the majority of travelers.

The traveler visualization module 54 may be further configured so that the traveler may indicate a desire to book one of the displayed travel products. Choices made by the traveler interacting with the traveler visualization module 54 may be reflected on the display provided to the travel agent. The agent visualization module 52 may thereby enable the travel agent to see what the traveler has selected. The travel agent may then book the travel product for the traveler, or unlock the traveler visualization module 54 so that the traveler may book the travel product. In response to receiving an indication from the traveler that they want to book the travel product, the traveler visualization module 54 may transmit a booking request to the booking module 60.

In response to receiving a booking request from either of the agent or traveler visualization modules 52, 54, the booking module 60 may cause the GDS 12 to reserve the selected travel product and bill the traveler for the service. The booking module 60 may also provide a shopping cart. The shopping cart may allow the travel agent or traveler to select several travel products and place them in the shopping cart before making a final decision to purchase the products. The traveler visualization module 54 may provide a confirmation button to enable the traveler to verify that they wish to book the travel products. The agent visualization module 52 may be similarly configured so that the travel agent can place travel products in the shopping cart, and then cause the contents of the shopping cart to be displayed to the traveler for approval.

The traveler visualization module 54 may be a responsive design that adapts to characteristics of the traveler system 18. To this end, the traveler visualization module 54 may query the traveler system 18 for information regarding the type of device the traveler is using. This information may include information regarding the size, resolution, color depth, and other characteristics of the display, input capabilities (e.g., touch screen, keypad, or display only) provided by the HMI 40 of traveler system 18, or a processing capability of the traveler system 18 (e.g., the type of processor 32, amount of memory 34, or availability of a particular application 48). The traveler visualization module 54 may format travel information sent to the traveler system 18 based on this information to optimize the information for display by the traveler system 18. This feature may allow the information sharing module 51 to operate effectively across various types of traveler systems 18, such as different models of smart phones, tablet computers, internet ready televisions, optical head-mounted displays (e.g., smart glasses), and desktop computers, to name but a few.

The template module 56 may format the travel information provided to the traveler according to a predetermined or user specific template. The template may cause the traveler visualization module 54 to format the travel information presented to the traveler in a way that is specific to the traveler. This may include selecting how industry terminology is translated by the traveler visualization module 54. In an embodiment of the invention, the template may be selected from a plurality of templates by the travel agent through the agent visualization module 52. The template may also be selected by the template module 56 based on a traveler profile stored in the traveler profile database 58, or other information. Selecting or configuring the template based on the traveler profile may allow travel information to be formatted differently for different travelers. The template may also take into account the time during which the travel product will be used, such as the season when the information is requested. For example, during the summer, information may be presented in a different manner than in the winter or during the holidays.

The traveler profile database 58 may be provided, for example, by the GDS 12, the travel agency system 16, or other system accessible by the information sharing module 51. The traveler profile database may 58 be generated and maintained by an application or system unrelated to the information sharing module 51, such as a travel planning application. The traveler profile may include information such as, but not limited to: the traveler's country of origin, a preferred language of the traveler, IP addresses from which the traveler has accessed the system, a nationality of the traveler, special needs of the traveler, the type of traveler (e.g., leisure or business traveler), the presence or absence of a child (which may be determined based on requested travel information), or any other suitable traveler characteristics. With regard to special needs, the information sharing module 51 may alter how the various modules operate based on the type of special needs the traveler has. For example, if the traveler has difficulty seeing, the traveler visualization module 54 may adjust how information is displayed, such as by using a larger font or text to voice. Other disabilities may cause the agent visualization module 52 to indicate to the travel agent that travel products should have certain features, such as wheel chair access. The traveler profile database 58 may receive traveler profile data from the traveler, the travel agent, from another database, or may build a traveler profile based on previous travel viewing and bookings by the traveler.

When the traveler needs to decide which flight, itinerary, hotel, or other travel product they want to book for their trip, the travel agent may select shared travel information to be displayed by interacting with the user interface provided by the agent visualization module 52. The shared travel information may be displayed on the traveler system 18 by the user interface provided by the traveler visualization module 54. The travel agent may thereby select only relevant travel information to share with the traveler. The traveler may then choose which travel products they want to purchase, and provide feedback to the travel agent regarding the selected travel products. The travel agent may thereby provide assistance to a traveler on the go through a mobile device, or while the traveler is at home on a desktop computer. The information sharing module 51 may also facilitate telecommuting by the travel agent by allowing the travel agent to work from home. Embodiments of the invention may also allow pooling of travel agent resources by locating travel agents in one place, and placing kiosks equipped with internet access and cameras for video conferencing in remote locations, such as travel agency offices, airports, or other suitable locations.

Figure 4:
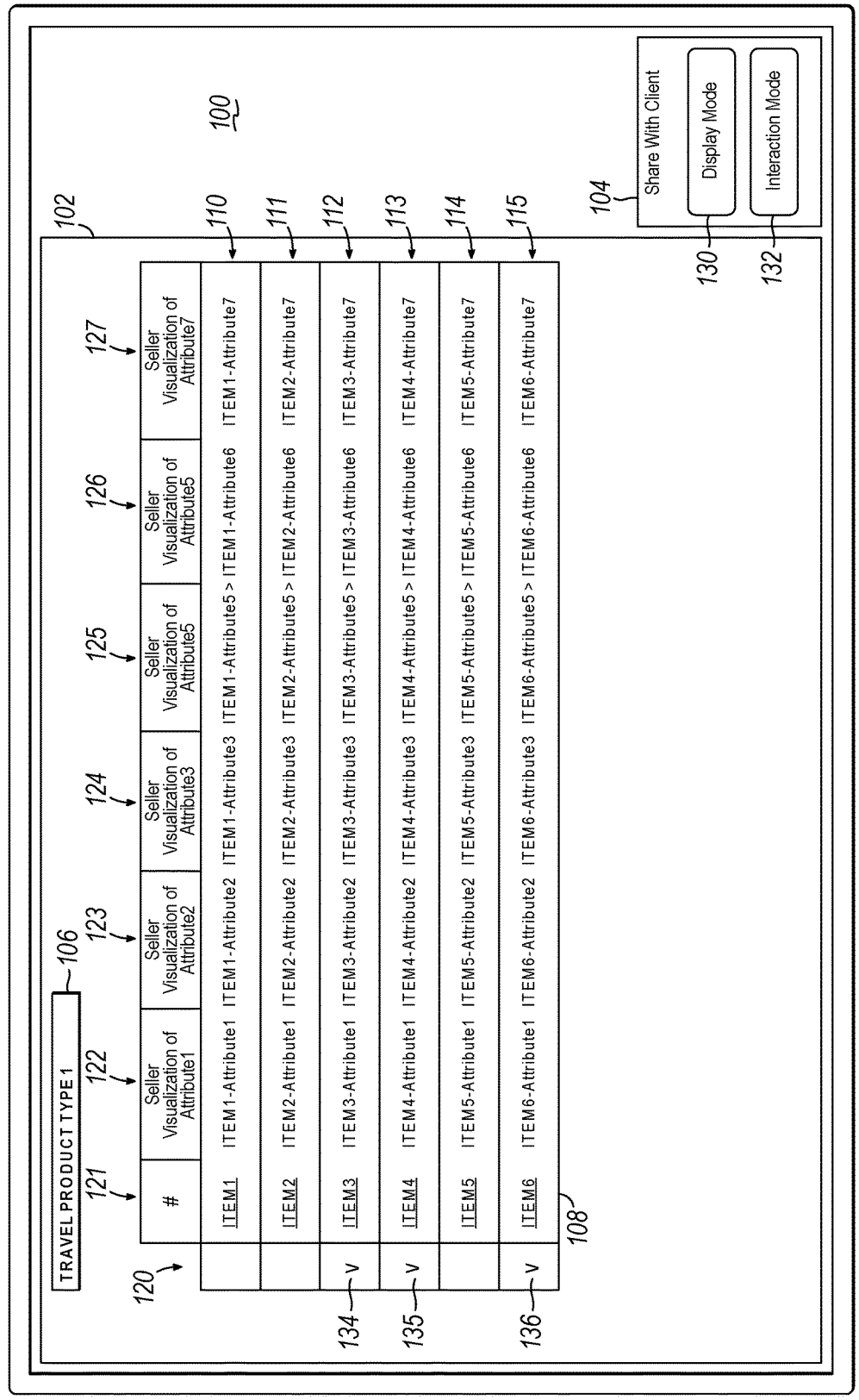
FIG. 4 is a diagrammatic view of a screen depicting travel information displayed to a travel agent via the travel agency system of FIG. 1.
Figure 5:
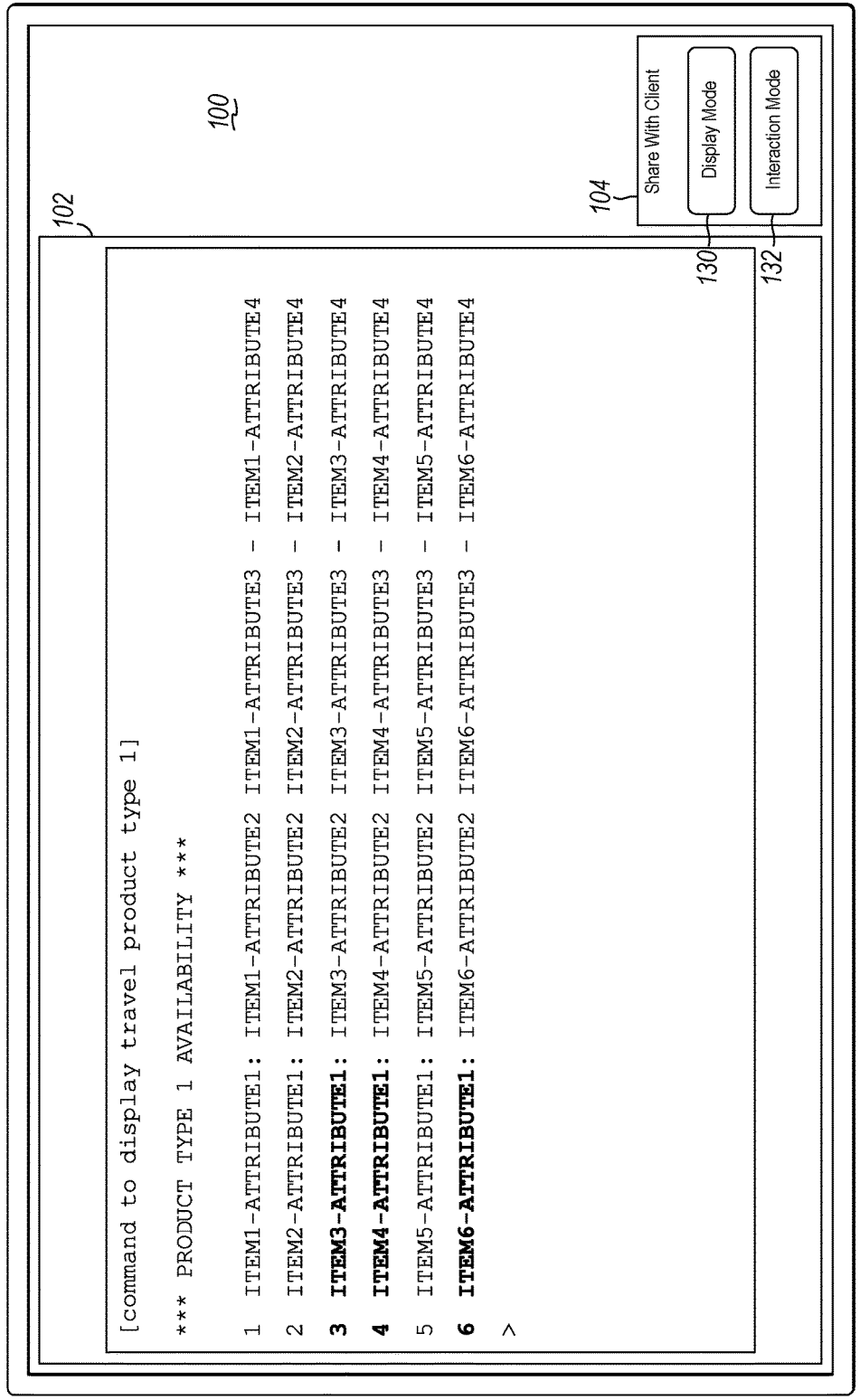
FIG. 5 is a diagrammatic view of a screen depicting the travel information of FIG. 4 being displayed to the travel agent in accordance with an alternative embodiment of the invention.

Referring now to FIGS. 4 and 5, an exemplary screen view 100 is presented that may be displayed to the travel agent by the agent visualization module 52 during the information sharing session. The screen view 100 may include an information window 102 and a sharing control window 104. The information window 102 may include a title 106 and an information table 108. In the exemplary embodiment shown, the information table 108 includes a plurality of rows 110-115 and a plurality of columns 120-127. Each row 110-115 may correspond to a travel product, and each column 120-127 may define a type of information relating to the travel products in rows 110-115. The intersections of the rows 110-115 and the columns 120-127 may define data fields in which travel product information is presented. In an alternative embodiment of the invention shown in FIG. 5, the information window 102 may be configured to display the travel product information in a different format, such as a command line format, in which case the information table 108 may be omitted.

The travel information displayed in the information window 102 may be received from the travel database system 22 in response to a travel request or search query sent from the travel agency system 16 or traveler system 18. For example, the travel agent may select travel products based on the type of travel desired by the traveler, which the traveler may communicate to the travel agent in person, over the phone, by e-mail, though a shared link (e.g., a chat room or instant messaging application), or by any other suitable type of communication. For example, the traveler may say "I would like a flight next week from Boston to Chicago", in response to which the travel agent would enter flight search criteria with an origin of Boston, a destination of Chicago, and a departure date for next week into a search query. One or more search queries based on the desires of the traveler may be sent or transmitted from the travel agency system 16 to the travel database system 22. In response to receiving the search query, the travel database system 22 may transmit information on travel products to the travel agency system 16. The travel information may be received by the agent visualization module 52 and displayed in the information window 102.

To share travel information with the traveler, the travel agent may select a subset of the travel information displayed in the information window 102. This selection may be performed by the travel agent selecting one or more of the rows 110-115, or one or more individual cells defined by the intersections of the rows 110-115 and columns 121-127. For example, the travel agent may select a row by moving and clicking a mouse, entering keystrokes, or by any other suitable means of providing user input to the travel agency system 16. The travel agent may also share the entire set of results by not selecting a subset prior to sharing the information. In response to the travel agent selecting a travel product, the information window 102 may provide an indication that the travel product has been selected. Exemplary indications may include adding an indicator to a corresponding data field (e.g., check marks 134-136 in corresponding check boxes of column 120 as shown in FIG. 4), or highlighting a portion of the command line associated with the selected travel product, as shown in FIG. 5.

The sharing control window 104 may be configured to allow the travel agent to selectively share the travel products displayed in the information window 102. The sharing control window 104 may include a display mode button 130 and an interaction mode button 132 for selecting how the information is displayed to the traveler. Information related to the selected travel products may not be displayed to the traveler until the travel agent activates one of the display mode button 130 or the interaction mode button 132. In an alternative embodiment of the invention, the travel agent may provide some other suitable input via the HMI 40 of travel agency system 16, such as keystrokes or a keyboard shortcut, that indicates to the information sharing module 51 that the travel agent wishes to have the selected travel information displayed to the traveler. In any case, embodiments of the invention are not limited to a particular method of indicating to the information sharing module 51 that the selected travel information should be displayed to the traveler.

In use, once the travel agent is satisfied with their selections, the travel agent may activate one of the buttons 130, 132 to display the selected travel products to the traveler. If the travel agent activates one of the buttons 130, 132 without having selected a subset of the travel products displayed in the information window 102, then the entire list of travel products displayed in information window 102 may be shared with the traveler. In any case, in response to the travel agent activating one of the buttons 130, 132, information relating to the selected travel products may be displayed via the HMI 40 of traveler system 18 so that the information is presented to the traveler. The travel agent may initially share the information in the display mode by activating the display mode button 130 so that the traveler is locked out from selecting or otherwise interacting with the shared travel products. That is, when the display mode button 130 is activated, the lock-out feature described above may prevent the traveler from doing anything other than viewing the shared travel products displayed on the HMI 40 of traveler system 18.

In some cases, the travel agent may wish to allow the traveler to interact with the displayed travel products, such as manually browsing or booking the displayed travel products. In this case, the travel agent may display the selected travel products to the traveler by activating the interaction mode button 132. In response to the travel agent activating the interaction mode button 132, the information sharing module 51 may disable the lockout feature and enter the interaction mode, thereby allowing the traveler to interact with the displayed travel products. This interaction may include, for example, the traveler selecting or booking a displayed travel product using the HMI 40 of traveler system 18. So that the travel agent is aware of which mode is active, the display mode button 130 and interaction mode button 132 may be configured to provide an indication of which mode is currently active. The travel agent may thereby control when and how information on the selected travel products is displayed to the traveler using the display mode button 130 and the interaction mode button 132 of sharing control window 104.

Figure 6:
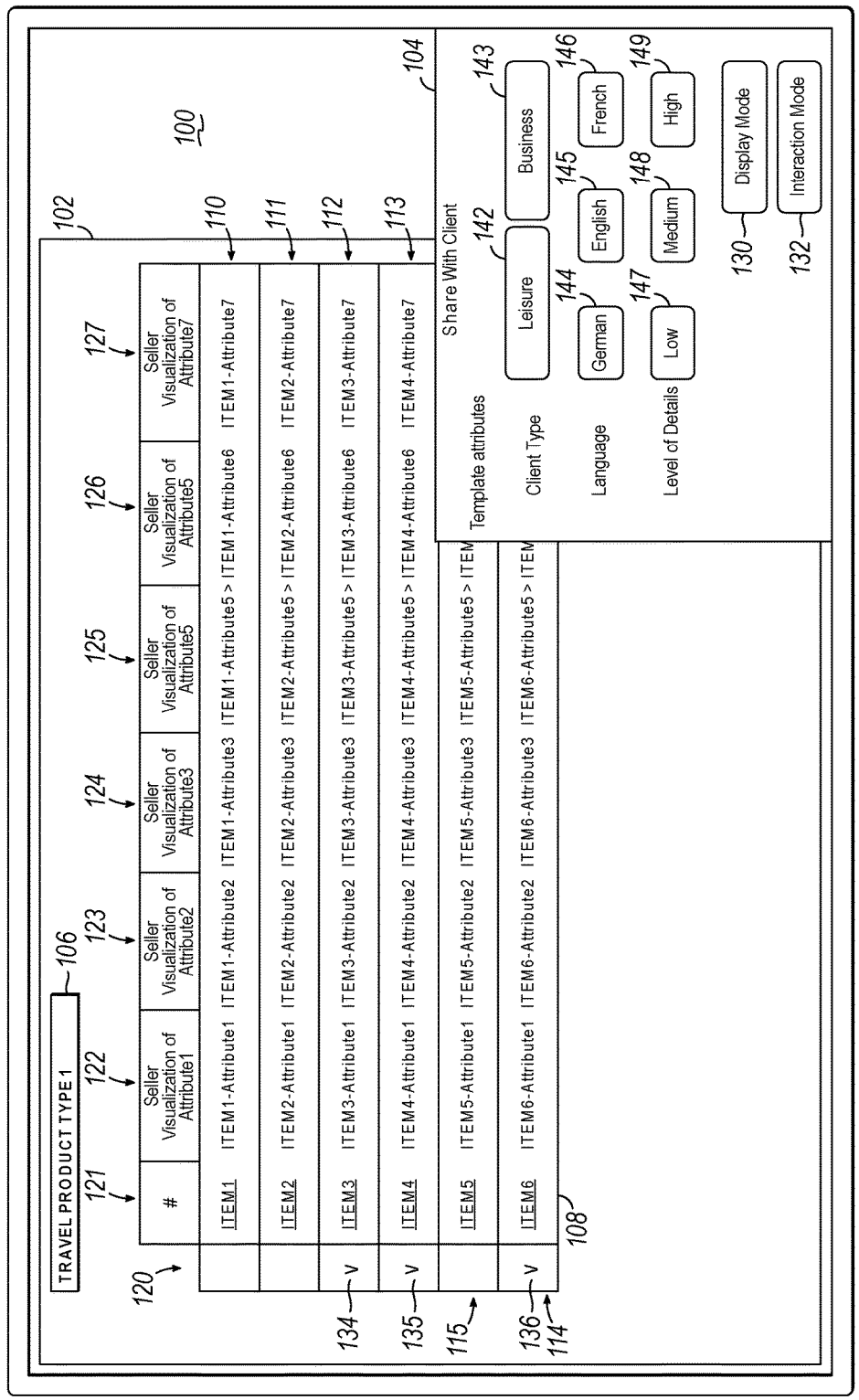
FIG. 6 is a diagrammatic view of the screen depicted in FIG. 4 further displaying a control window.

Referring now to FIG. 6, the agent visualization module 52 may allow the travel agent to expand the sharing control window 104 to include buttons 142-149 for adjusting template attributes. The sharing control window 104 may provide the travel agent with an ability to input or alter template parameters. The travel agent may thereby determine what travel information is provided to the traveler system 18 by the traveler visualization module 54, and how the travel information is displayed on the traveler system. The template parameters may be automatically determined or preselected based on the traveler profile. The traveler profile may also be adjusted based on previous bookings by the traveler. These automatically determined parameters may, however, be overridden by the travel agent if desired using the sharing control window 104.

The agent visualization module 52 may suggest template parameter values to the travel agent based on the traveler profile. In the exemplary embodiment depicted, the sharing control window 104 provides three adjustable template parameters: (1) traveler-type, which may be selected as leisure or business by activating the corresponding button 142, 143; (2) language, which may be selected as German, English, or French by activating the corresponding button 144-146; and (3) the level of detail displayed by the traveler visualization module 54. The template parameter values may allow the shared travel information to be adapted to the specific needs of the traveler. For example, the shared travel information may be displayed taking into account a commercial nature of the shared travel information by including photos, videos, or other suitable multi-media presentations.

In one usage scenario, the traveler may request travel to a certain destination by visiting or calling the travel agent, but the traveler may be uncertain on how they would like to get to the destination and when they would like to go. The travel agent may search in the travel database system 22 for travel products that satisfy the traveler's requirements by sending a search query from the travel agency system 16 to, for example, the GDS 12. The GDS 12 may return a plurality of options for travel on various dates, which may be displayed to the travel agent by the agent visualization module 52. The travel agent may then select a subset of the options for which they would like to have information displayed to the traveler. The information may then be transmitted or otherwise released to the traveler visualization module 54.

Figure 7:
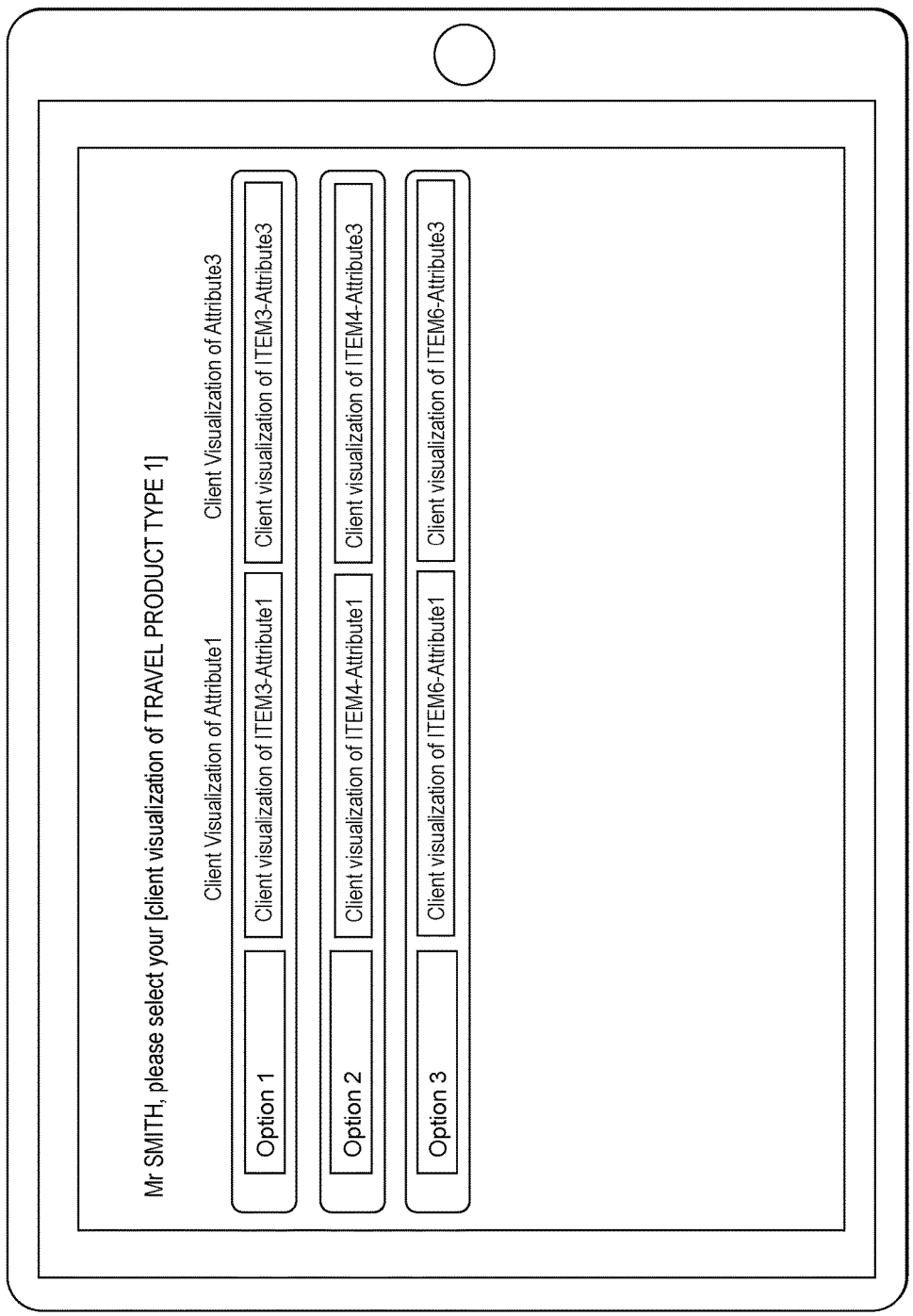
FIG. 7 is a diagrammatic view of a screen depicting travel information displayed to a traveler via the traveler system of FIG. 1.
Figure 8:
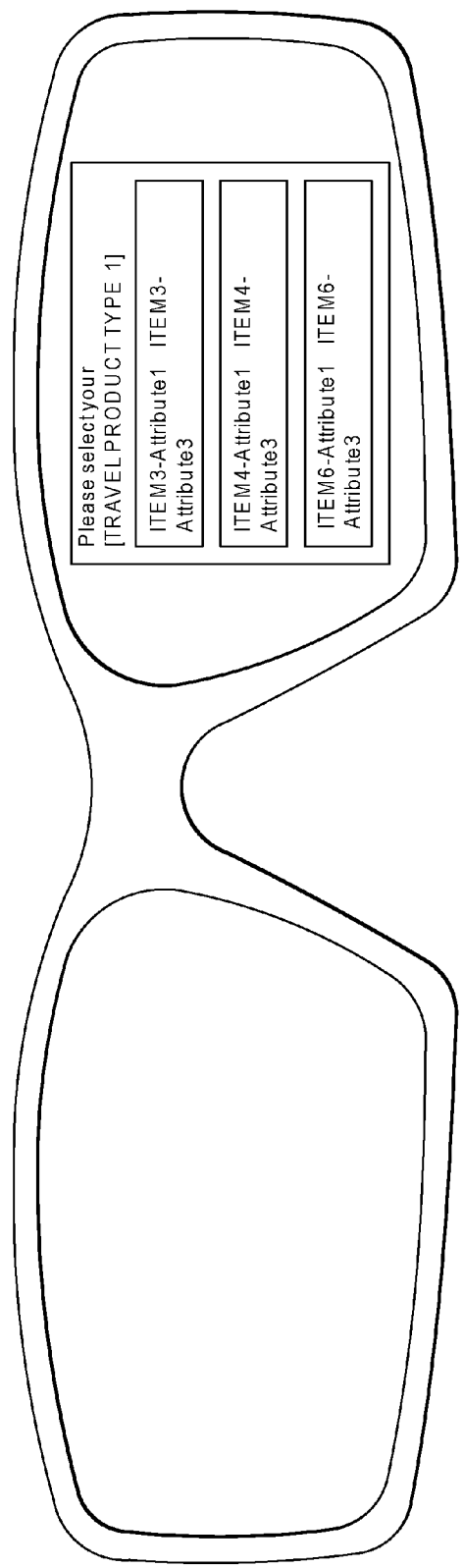
FIG. 8 is a diagrammatic view of the travel information from FIG. 7 being displayed to the traveler on an alternative type of display.

In response to receiving or otherwise gaining access to the shared travel information, the traveler visualization module 54 may display the travel information to the traveler on the traveler system 18. The traveler may then view the shared travel information and decide which travel products or itineraries are most compelling. The traveler may then inform the travel agent of their selection, either orally if the session is being conducted in person, over the phone, or using some other suitable method of communication tailored to the session. For example, travelers communicating with the travel agent through a shared web session may communicate using instant messaging or a chat room. FIGS. 7 and 8 provide examples of how the shared travel information selected by the travel agent in FIGS. 4-6 may be displayed to the traveler. FIG. 7 depicts the shared travel information being displayed on a tablet computer, while FIG. 8 depicts the shared travel information being displayed on an optical head-mounted display. In each case, the information may be formatted by the traveler visualization module 54 based on the type of device being used to view the information.

In an embodiment of the invention, the traveler may receive additional information on one of the displayed travel products by activating an information button (not shown), by hovering over the travel option, or by any other suitable method of requesting additional information. The additional information may then be presented to the traveler in a pop-up window or other suitable display. Additional information may include information related to waiting times, departure times, arrival times, room amenities, specifications of a rental vehicle, or any other suitable information.

If the traveler determines they want to book one of the travel products being displayed, they may instruct the travel agent to book the selected travel product. In an embodiment of the invention, the traveler visualization module 54 may provide the traveler with the option of booking the desired travel product by simply selecting the travel product. Selecting the travel product may be performed, for example, by clicking on the desired travel product. In response to either the travel agent or traveler booking the selected travel product, the agent visualization module 52 or traveler visualization module 54, as the case may be, may transmit the booking request for the selected travel product to the booking module 60, which may complete the booking process.

In an exemplary transaction, the travel agent may suggest travel products sequentially rather than at the same time. For example, the travel agent may start by helping the traveler select transportation, such as a flight. The travel agent may request flight information from the travel database system 22 for flights connecting the origination and destination cities on desired travel dates. This travel request may return a plurality of flights. Depending on the number of flights available, the travel agent may select a subset of flights to share with the traveler, or may share all the flights. The shared travel information may then be presented to the traveler so that the traveler can decide which, if any, of the flights they would like to book.

Once transportation arrangements have been selected, the travel agent may request lodging information from the travel database system 22. The travel database system 22 may return a plurality of hotels, from which the travel agent may again select a subset to display to the traveler. In a similar manner as described above with respect to selecting the flight, the traveler may decide which hotel they would like to stay in, and indicate their choice to the travel agent.

The travel agent may then search for travel products provided at the destination, such as a rental vehicle, leisure activities, service upgrades, or any other travel product which the travel agent believes the traveler may be interested in. As travel products are selected, they may be added to the shopping cart for booking once the selection process is complete. This may enable the traveler to review the completed itinerary prior to booking the travel products, thereby facilitating changes to the itinerary. Upon approval by the traveler, one or more booking requests may be transmitted to the booking module 60 to reserve the selected travel products.

Figure 9:
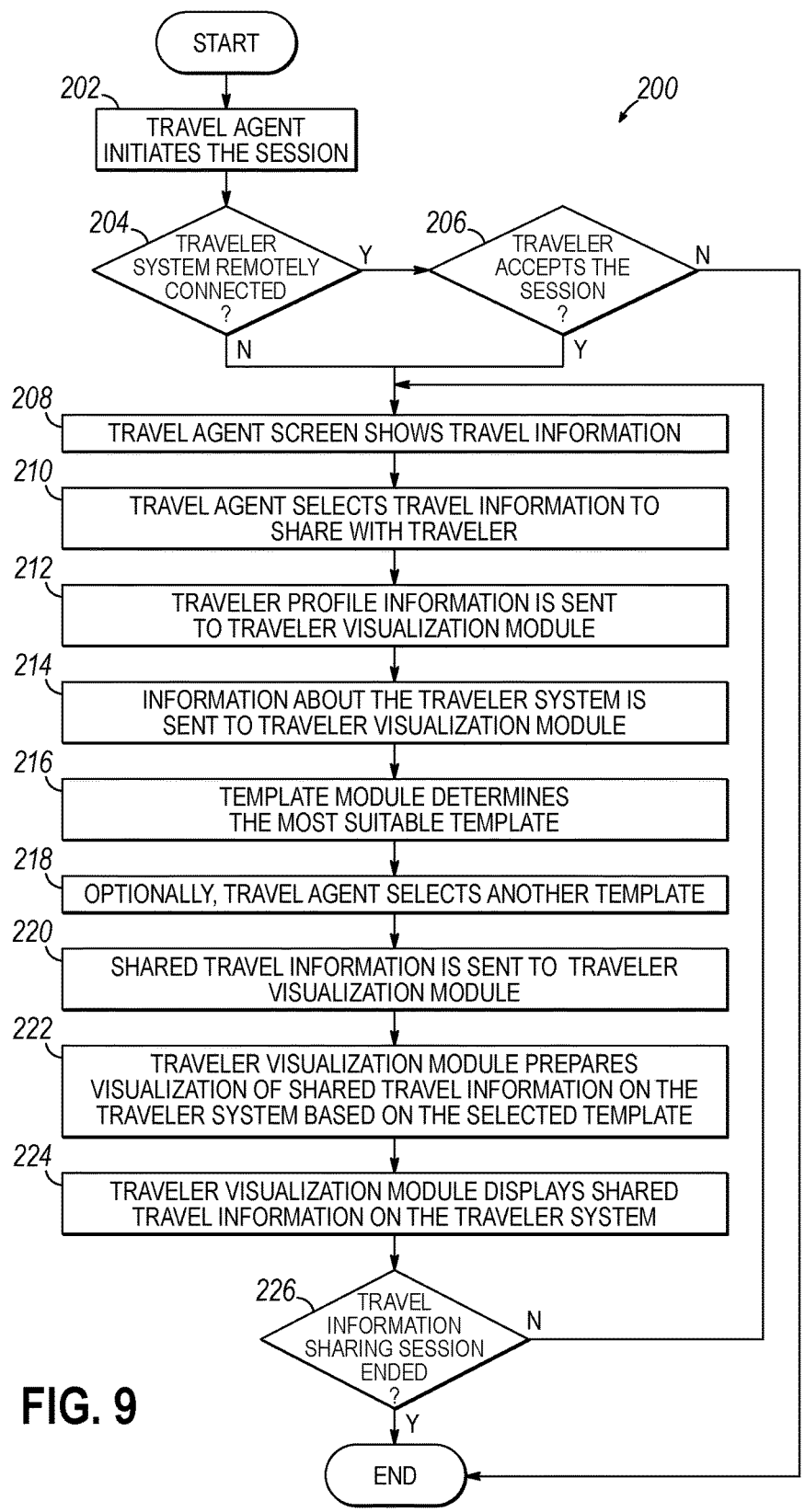
FIG. 9 is a flowchart depicting a process that may be executed by the information sharing module of FIG. 3 for an information sharing session initiated by the travel agent.

Referring now to FIG. 9, a flowchart is presented that depicts an exemplary process 200 that may be executed by the information sharing module 51 in which the travel agent initiates the information sharing session with the traveler. In block 202, the travel agent initiates the information sharing session. The travel agent may initiate the session in response to the traveler requesting help planning a trip. The travel agent may initiate the session, for example, by sending a link to the traveler system 18.

In block 204, the process 200 may determine if the traveler system 18 is remotely connected, or part of a local system. If the traveler system 18 is remotely connected ("YES" branch of decision block 204), the process 200 may proceed to block 206. If the traveler system 18 is not remotely connected ("NO" branch of decision block 204), the information module may proceed to block 208. This may occur, for example, if the traveler appears in person at the travel agency and views the shared travel information on a system or monitor connected directly to the travel agency system 16.

In block 206, the process 200 may cause the traveler system 18 to display a request to accept the information sharing session. In response to the traveler indicating that they accept the session ("YES" branch of decision block 206), the process 200 may proceed to block 208. In response to the traveler rejecting the session ("NO" branch of decision block 206), the process 200 may end.

In block 208, the process 200 may display travel information to the travel agent via the agent visualization module 52 as described above with respect to FIGS. 4-6. In block 210, the travel agent may select the subset of travel products and a desired template for displaying the travel information to the traveler. In response to the travel agent selecting the information to be shared with the traveler, the process 200 may proceed to block 212.

In block 212, the traveler visualization module 54 may receive traveler profile information. The traveler profile information may be obtained, for example, from the traveler profile database 58. In block 214, the traveler visualization module 54 may receive information regarding display capabilities of the traveler system 18. This information may be acquired, for example, through an information exchange between the traveler system 18 and traveler visualization module 54 during initiation of the session. The traveler visualization module 54 may thereby receive information relating to characteristics of the HMI of the traveler system 18, such as resolution and size of the display, so that shared travel information may be formatted for the traveler system 18.

In block 216, the template module 56 may select a template for displaying the shared travel information on the traveler system 18 based on the user profile and display capabilities information. In block 218, the template selected by the template module 56 may be provided to the agent visualization module 52 and/or traveler visualization module 54. The agent visualization module 52 may provide the travel agent with the ability to select a different template, or change parameters in the template selected by the template module 56.

In block 220, the shared travel information may be sent to the traveler visualization module 54. In block 222, the traveler visualization module 54 may format the shared travel information based on the selected template and the display capabilities of the traveler system 18. Once the travel information is formatted, the process 200 may proceed to block 224. In block 224, the traveler visualization module 54 may cause the HMI 40 of traveler system 18 to display the shared travel information. The traveler may then select a travel product for adding to the shopping cart, request additional information on one of the displayed travel products, or request a new selection of travel products. The process may then proceed to block 226.

If the traveler has finished adding travel products to the shopping cart, the information sharing session may end ("YES" branch of decision block 226). If the traveler has additional travel products they wish to purchase, the process 200 may return to block 208, and the travel agent may search for additional travel products. In subsequent passes through the flow chart, the process 200 may optionally skip blocks 212, 214, 216, 218 since the traveler profile, template, and display capabilities of the traveler system 18 may already be known.

Figure 10:
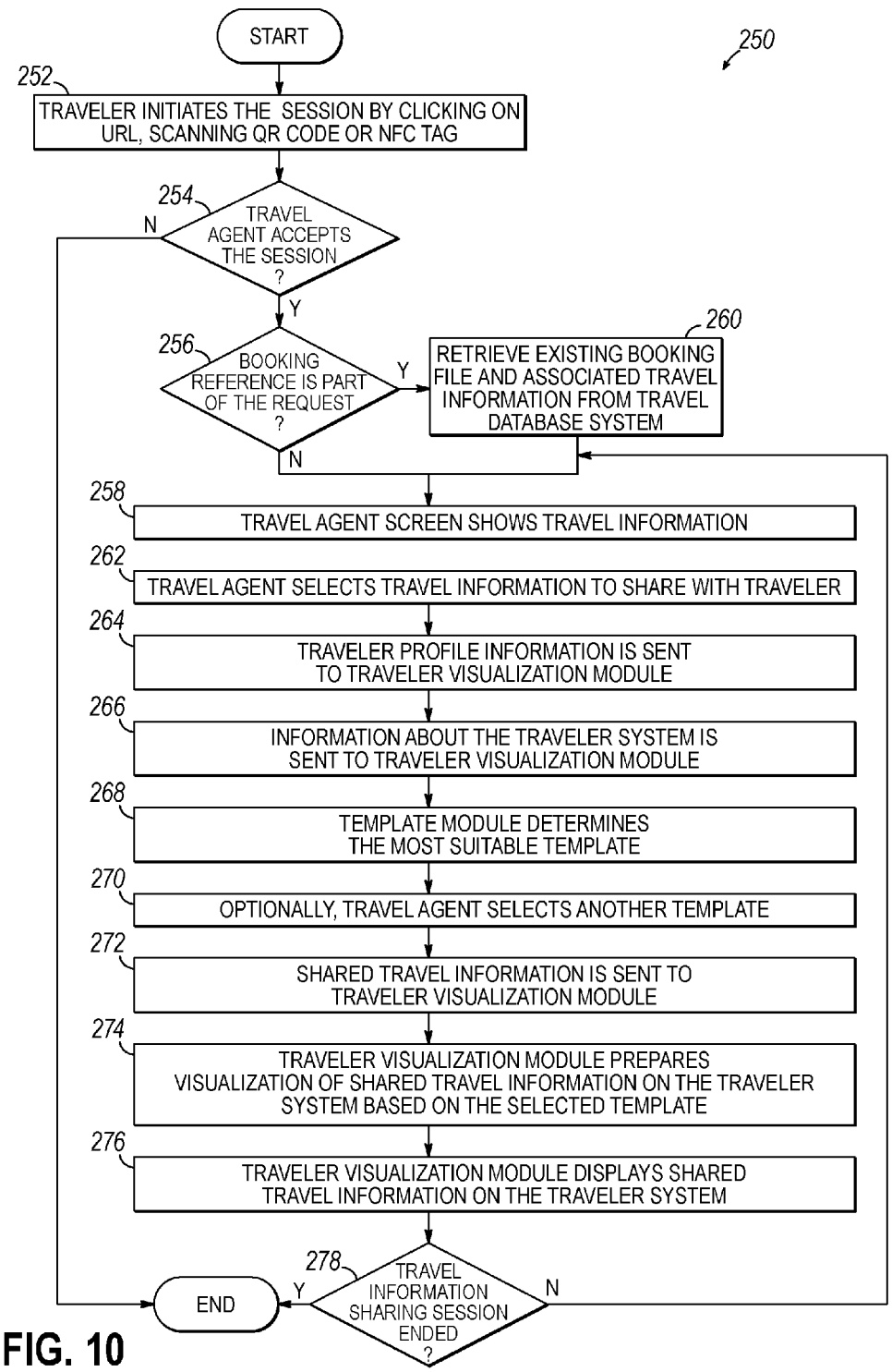
FIG. 10 is a flowchart depicting a process that may be executed by the information sharing module of FIG. 3 for an information sharing session initiated by the traveler.

Referring now to FIG. 10, a flowchart is presented that depicts a process 250 in which a traveler initiates the information sharing session with the travel agent. In block 252, the traveler initiates the information sharing session. The traveler may initiate the information sharing session, for example, by activating a URL, scanning a QR code, scanning a Near Field Communication (NFC) tag, or scanning a Radio Frequency Identification (RFID) tag using the traveler system 18. In response, the traveler system 18 may transmit a session request to the travel agency system 16.

In block 254, the travel agency system 16 may receive the session request and alert the travel agent that the request has been received. In response to the travel agent accepting the session request ("YES" branch of decision block 254), the process 250 may proceed to block 256. In response to the travel agent refusing the session request ("NO" branch of decision block 256), the process 250 may end without starting the information sharing session.

In block 256, the process 250 may determine if a booking reference is included in the session request. The booking reference may be an identifier, such as a record locator, that identifies a previously saved booking file. This booking file may include a travel itinerary or shopping cart from an earlier travel planning session. That is, the booking file may have been generated during a previous information sharing session, by the traveler reserving travel products through a travel planning web site, by another travel agent, or by any other method of generating a travel itinerary. If the session request does not include the booking reference ("NO" branch of decision block 256), the process 250 may proceed to block 258. If the session request includes the booking reference ("YES" branch of decision block 256), the process 250 may proceed to block 260.

In block 260, the process 250 may retrieve the booking file and any associated travel information from the travel database system 22 before proceeding to block 258. In an alternative embodiment of the invention, the booking file may be stored somewhere other than in the GDS 12 or one of the CRSs 14, in which case the booking file may be retrieved from a system other than the travel database system 22. Persons having ordinary skill in the art will therefore understand that embodiments of the invention are not limited to a particular location for storing the booking file. In any case, the booking file may allow the traveler to resume planning a trip that was started previously using any suitable travel planning application or system.

In block 258, the process 250 may display travel information to the travel agent via the agent visualization module 52 as described above with respect to FIGS. 4-6 before proceeding to block 262. In block 262, the travel agent may select the subset of travel products and the desired template for displaying the travel information to the traveler. In response to the travel agent selecting the information to be shared with the traveler, the process 250 may proceed to block 264.

In block 264, the traveler visualization module 54 may receive traveler profile information. The traveler profile information may be obtained, for example, from the traveler profile database 58. In block 266, the traveler visualization module 54 may receive information regarding characteristics of the traveler system 18. This information may be received from the traveler system 18, and may include the size and resolution of the display portion of the HMI 40 of traveler system 18 as described in more detail above.

In block 268, the traveler visualization module 54 may select a template for displaying the shared travel information on the traveler system 18. This selection may be based at least in part on the user profile and traveler system display capabilities information. In block 270, the selected template may be provided to the agent visualization module 52 and/or traveler visualization module 54. The agent visualization module 52 may provide the travel agent with the ability to select a different template, or change parameters in the template selected by the template module 56.

In block 272, the shared travel information may be sent to the traveler visualization module 54. In block 274, the traveler visualization module 54 may format the shared travel information according to the selected template and the display capabilities of the traveler system 18. Once the travel information is formatted, the process 250 may proceed to block 276 where the traveler visualization module 54 may cause the traveler system 18 to display the shared travel information. The traveler may then select a travel product for adding to the shopping cart, request additional information on one of the travel products being displayed, or request a new selection of travel products. The process may then proceed to block 278.

If the traveler has finished adding travel products to the shopping cart, the information sharing session may end ("YES" branch of decision block 278). If the traveler has additional travel products they wish to purchase, the process 250 may return to block 258 so that the travel agent may search for additional travel products. In subsequent passes through the flow chart, the process 250 may optionally skip blocks 264, 266, 268, 270 since the traveler profile, template, and display capabilities of the traveler system 18 may already be known.

Figure 11A:
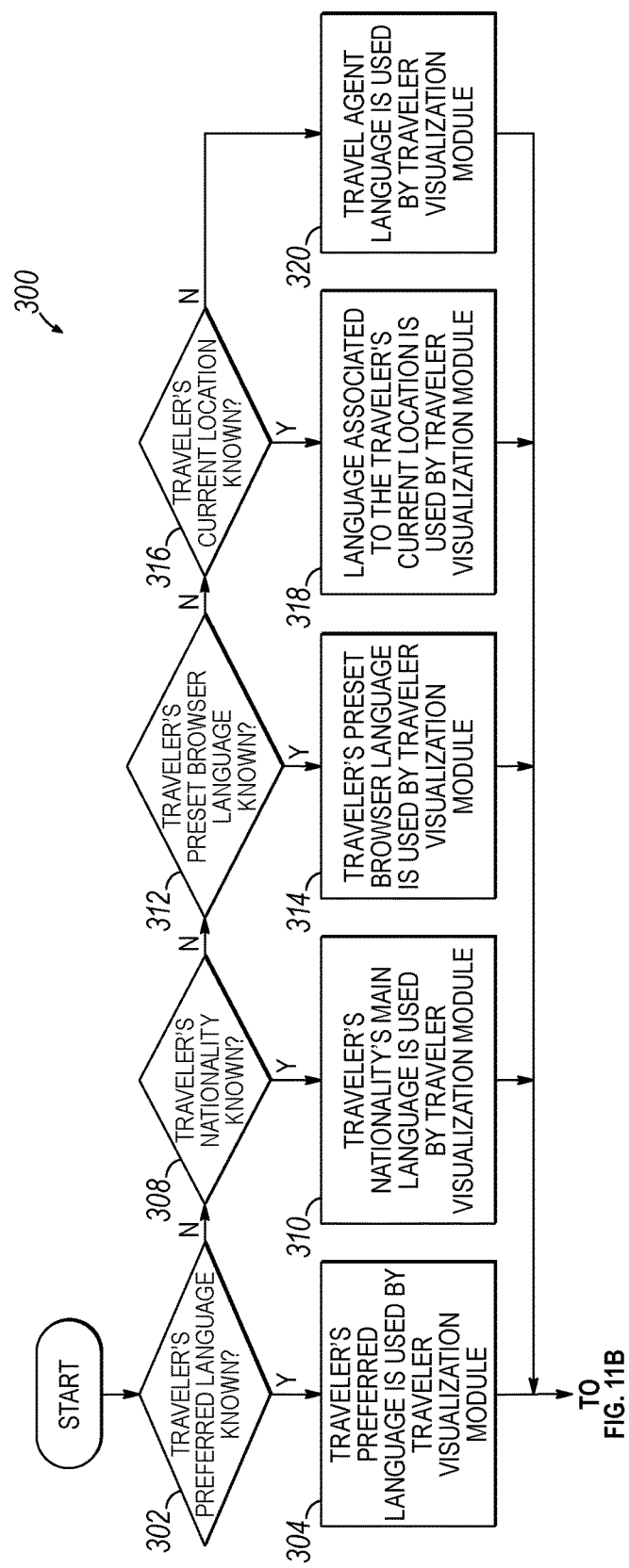
FIGS. 11A and 11B provide a flowchart depicting additional details of the processes of FIGS. 9 and 10.
Figure 11B:
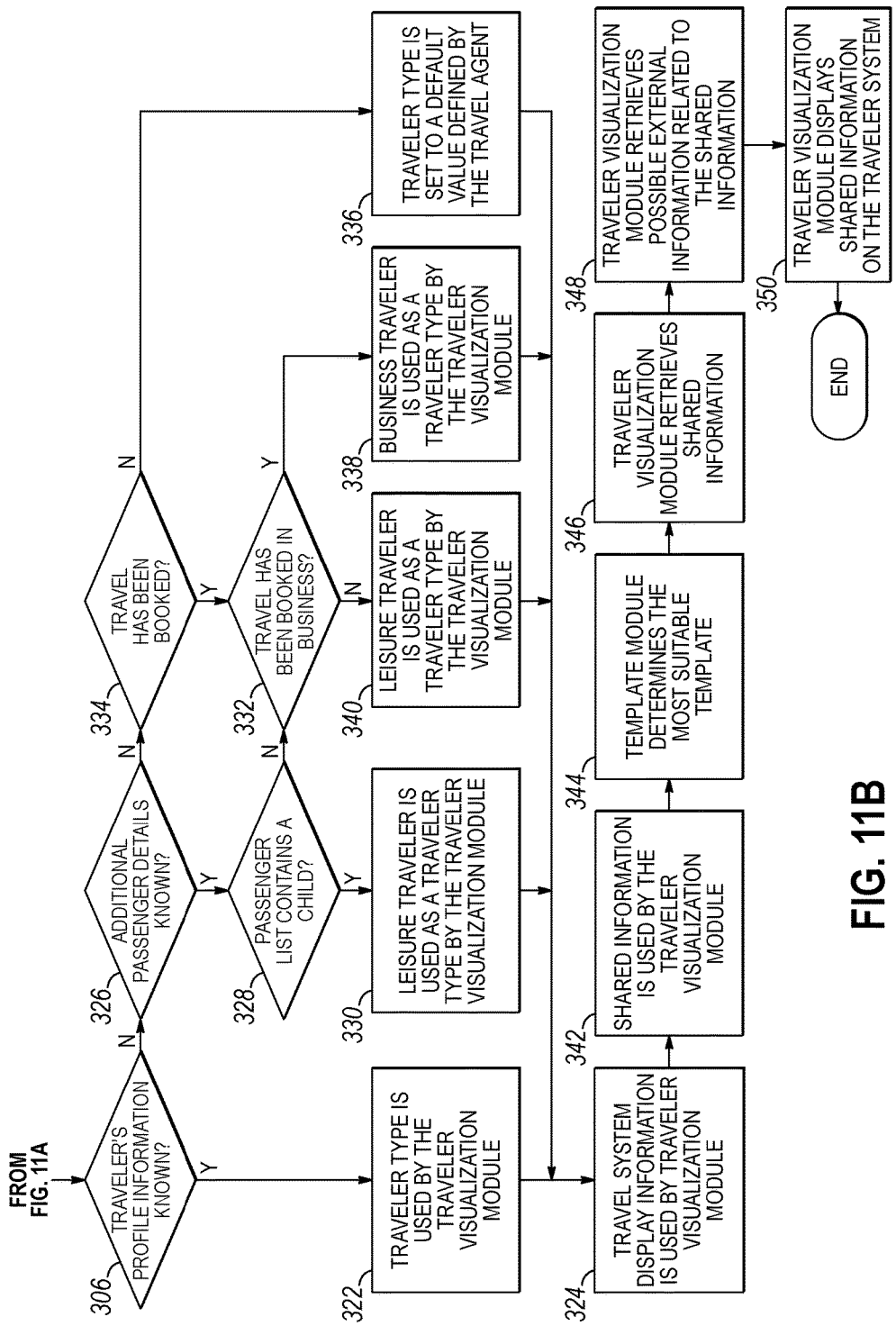

Referring now to FIGS. 11 and 12, a flowchart is presented that depicts a process 300 that may be executed by the information sharing module 51 for determining the traveler profile and selecting the template. In block 302, the process 300 may determine if the preferred language of the traveler is known. This determination may be based on the traveler profile, or on information provided by the travel agent or traveler. If the preferred language is known ("YES" branch of decision block 302), the process 300 may proceed to block 304. In block 304, the process 300 may configure the traveler visualization module 54 to use the preferred language before proceeding to block 306. If the traveler's preferred language is not known ("NO" branch of decision block 302), the process 300 may proceed to block 308.

In block 308, the process 300 may determine if the traveler's nationality is known. If the traveler's nationality is known ("YES" branch of decision block 308), the process 300 may proceed to block 310. In block 310, the process 300 may select a language used by nationals from the client's country, and configure the traveler visualization module 54 to use the selected language before proceeding to block 306. If the traveler's nationality is not known ("NO" branch of decision block 308), the process may proceed to block 312.

In block 312, the process 300 may determine if the traveler's browser has a preset language preference. If the traveler's preset browser language is known ("YES" branch of decision block 312), the process 300 may proceed to block 314. In block 314, the process 300 may configure the traveler visualization module 54 to use the preset browser language before proceeding to block 306. If the traveler's preset browser language is not known ("NO" branch of decision block 312), the process may proceed to block 316.

In block 316, the process 300 may determine if the traveler's current location is known. The current location of the traveler may be based on, for example, GPS coordinates received from the traveler system 18 (e.g., a GPS location provided by a smart phone), by looking up an IP address or top-level domain on a WHOIS service, or any other suitable method of determining the traveler's location. If the traveler's current location is known ("YES" branch of decision block 316), the process 300 may proceed to block 318. In block 318, the process 300 may select a language associated with the traveler's current location and configure the traveler visualization module 54 to use the selected language before proceeding to block 306. If the traveler's current location is not known ("NO" branch of decision block 316), the process may proceed to block 320 and configure the traveler visualization module 54 to use the language of the travel agent before proceeding to block 306.

In block 306, the process 300 may determine if the traveler's profile information is known. The traveler's profile information may be known, for example, by the traveler being associated with a traveler profile in the traveler profile database 58. If the traveler's profile is known ("YES" branch of decision block 306), the process 300 may proceed to block 322. In block 322, the process 300 may determine a traveler-type from the traveler profile. The process 300 may then configure the traveler visualization module 54 to use the determined traveler-type to format shared travel information for display by the traveler system 18 before proceeding to block 324. This may be accomplished, for example, by setting the traveler-type parameter in the template to the determined traveler-type. If the traveler's profile information is not known, the process may proceed to block 326.

In block 326, the process 300 may determine if additional passenger details are known. These details may include the number and types of passengers that will be traveling on the trip. If additional passenger details are known ("YES" branch of decision block 326), the process 300 may proceed to block 328. In block 328, the process 300 may determine if any children are included on a passenger list. If one or more children are included on the passenger list ("YES" branch of decision block 328), the process 300 may proceed to block 330 and configure the traveler visualization module 54 to use a leisure traveler display format before proceeding to block 324. If no children are on the passenger list ("NO" branch of decision block 328), the process may proceed to block 332.

If additional passenger details are not known ("NO" branch of decision block 326), the process 300 may proceed to block 334. In block 334, the process 300 may determine if any travel products have been booked for the trip. If no travel products have been booked ("NO" branch of decision block 334), the process 300 may proceed to block 336 and configure the traveler visualization module 54 to use a default traveler type, which may be set by the travel agent. The process 300 may then proceed to block 324. If a travel product has been booked ("YES" branch of decision block 334), the process 300 may instead proceed to block 332.

In block 332, the process 300 may determine if the travel product was booked for business travel. If the travel product was booked for business travel ("YES" branch of decision block 332), the process 300 may proceed to block 338 and set the traveler-type parameter of the template to business traveler before proceeding to block 324. If the travel product was not booked for business travel ("NO" branch of decision block 332), the process 300 may proceed to block 340 and set the traveler-type parameter in the template to leisure traveler before proceeding to block 324.

In block 324, the traveler visualization module 54 may use the information regarding the capabilities of the traveler system 18 to provide additional formatting to the shared travel information before proceeding to block 342.

In block 342, the traveler visualization module 54 may select or define the template for displaying the shared travel information on the traveler system 18. This selection may be based at least in part on the traveler information or selected template parameters, such as the traveler-type parameter. In block 344, the template module 56 may select the template, which may be provided to the traveler visualization module 54. In block 346, the traveler visualization module 54 may retrieve the shared travel information. In block 348, the traveler visualization module 54 may retrieve additional travel information related to the shared travel information from an external source, such as a web site. The process 300 may then proceed to block 350. In block 350, the traveler visualization module 54 may cause the traveler system 18 to display the shared and additional travel information. The traveler may then select a travel product to add to the shopping cart, or request a new selection of travel products.

Referring now to FIGS. 12-14, FIG. 12 depicts an exemplary screen view 360 of travel information that may be displayed on the travel agency system 16 by the agent visualization module 52. The depicted travel information is presented in a cryptic format that may allow the travel agent to quickly view and interpret large amounts of information. In the exemplary embodiment, information pertaining to four flights 362a-364a is displayed. The travel agent has selected two of the flights 362a, 364b to be shared with the traveler, which may be highlighted to indicate to the travel agent that they have been selected.

FIG. 13 depicts a screen view 370 that may be displayed on the traveler system 18 by the traveler visualization module 54. The shared travel information of the selected flights 362a, 364a from the screen view 360 has been reformatted into display windows 372, 374 by the traveler visualization module 54. As part of the reformatting process, the traveler visualization module 54 may convert the flight codes provided to the travel agent into text narratives understandable by the lay traveler. In the depicted embodiment, the traveler visualization module 54 is displaying the shared text information in French. The shared travel information may be displayed in French in response to the language parameter in the template being set to French as described above with respect to FIG. 11.

FIG. 15 depicts a screen view 380 that may be displayed on the traveler system 18 by the traveler visualization module 54 in response to English being selected as the preferred language. The shared travel information of the selected flights 362a, 364a from the screen view 360 has been reformatted into display windows 382, 384 by the traveler visualization module 54. As part of the formatting process in the depicted screen view 380, the traveler visualization module 54 has converted the flight codes provided to the travel agent into English narratives understandable by the lay traveler. Similarly as described above with respect to FIG. 14, the shared travel information may be displayed in English in response to the language parameter in the template being set to English.

It can be generally observed that although the screen view 360 shows much of the information shown in the screen views 370, 380, the shared travel information has been reformatted by the traveler visualization module 54 to suit the needs of the traveler. For example, the carrier codes and International Air Transport Association (IATA) codes indicating the airport station have been converted into terms understandable to a typical traveler, who would not be familiar with the cryptic codes. Thus, embodiments of the invention may allow travel agents to present information to travelers that is understandable and less confusing than the cryptic codes used by the travel agency system 16.

Embodiments of the invention may further take into account the language requirements of the traveler and the display capabilities of the traveler system 18 to format data for the specific traveler. Cryptic time and date information may be formatted in a more familiar way for the average traveler. In addition, information regarding the equipment scheduled to transport the traveler may be added by the traveler visualization module 54, although such information is typically not displayed on the screen view 360. Thus, information that is not considered important to the travel agent may be retrieved by the traveler visualization module 54, such as from the GDS 12 or CRSs 14, and displayed on the traveler system 18. Similarly, certain information displayed on the screen view 360 may be omitted from the screen views 370, 380 if the information is deemed unimportant by the traveler. This filtering function may be set by default, based on the traveler profile, or the shared travel information.

The program code embodying any of the embodiments of the invention described herein is capable of being individually or collectively distributed as a program product in a variety of different forms. In particular, the program code may be distributed using computer-readable media, which may include computer-readable storage media and communication media. Computer-readable storage media, which are inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer-readable instructions, data structures, or other program modules. By way of example, and not limitation, communication media may include wired media such as a wired network or direct-wired connection, and wireless media such as acoustic, RF, infrared and other wireless media. Combinations of any of the above may also be included within the scope of computer-readable media.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

In addition, program code described herein may be identified based upon the application or software component within which the program code is implemented in a specific embodiment of the invention. However, it should be appreciated that any particular program nomenclature that follows is used merely for convenience, and thus the invention should not be limited to use solely in any specific application identified and/or implied by such nomenclature. It should be further appreciated that the various features, applications, and devices disclosed herein may also be used alone or in any combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), and/or across one or more hardware platforms, it should be appreciated that the invention is not limited to the specific organization and allocation of program functionality described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method comprising:
    displaying, by a first computer on a first user interface associated with a travel agent, first travel information relating to a plurality of travel products;
    receiving, at the first computer, first input defining a subset of the travel products selected by the travel agent for sharing with a traveler and a first display mode in which second travel information relating to the travel products in the subset is locked, when displayed on a second user interface, to disable selection of the travel products in the subset by the traveler;
    causing, by the first computer, the second travel information relating to the travel products in the subset to be displayed on the second user interface in the first display mode, the second travel information excluding the first travel information relating to the travel products that are not part of the subset;
    after causing the second travel information relating to the travel products in the subset to be displayed on the second user interface in the first display mode, receiving, at the first computer, a second input from the travel agent defining a second display mode in which one or more of the travel products in the subset are selectable by the traveler;
    in response to receiving the second input from the travel agent, causing one or more of the travel products in the subset to be unlocked on the second user interface for booking by the traveler;
    after causing the one or more of the travel products in the subset to be unlocked on the second user interface for booking by the traveler, receiving, at the first computer, an input from the traveler indicative of a desire to book a selected one of the travel products in the subset; and
    in response to receiving the input from the traveler, booking the selected one of the travel products.

2. The method of claim 1 wherein the first travel information has a first format, and further comprising:
    reformatting the first travel information from the first format to a second format,
    wherein the second travel information is caused to be displayed in the second format.

3. The method of claim 2 wherein the first travel information is reformatted from the first format to the second format based on a template.

4. The method of claim 3 further comprising:
    receiving a profile of the traveler; and
    configuring the template based on the profile.

5. The method of claim 3 wherein the second user interface is associated with a second computer, and further comprising:
    receiving information indicative of a characteristic of the second computer; and
    configuring the template based on the characteristic of the second computer.

6. The method of claim 5 wherein the characteristic is a resolution of a display associated with the second computer, a size of the display, a color depth of the display, an input capability of a human machine interface of the second computer, or a processing capability of the second computer.

7. The method of claim 3 wherein the template includes a language parameter, and further comprising:
    determining the language parameter based on a preferred language of the traveler, a nationality of the traveler, a browser language setting, a current location of the traveler, or a language of the travel agent.

8. The method of claim 3 wherein the template includes a traveler-type parameter, and further comprising:
    determining the traveler-type parameter based on a profile of the traveler, a presence of a child on a passenger list, previously-booked travel by the traveler, or a default value.

9. The method of claim 1 wherein the second user interface is associated with a second computer, the first display mode allows the traveler to obtain third travel information relating to the travel products in the subset, and further comprising:
    receiving, at the second computer, the third travel information obtained from a third computer; and
    displaying the third travel information on the second user interface.

10. The method of claim 9 further comprising:
    in response to receiving an input from the traveler, transmitting a query to the third computer,
    wherein the third travel information is received by the second computer in response to the query.

11. An apparatus comprising:
    a first user interface;
    one or more processors coupled to the first user interface; and a memory coupled to the one or more processors and including instructions that, when executed by at least one of the one or more processors, cause the apparatus to:

display first travel information on the first user interface, the first travel information relating to a plurality of travel products;

receive first input defining a subset of the travel products selected by a travel agent for sharing with a traveler and a first display mode in which second travel information relating to the travel products in the subset is locked, when displayed on a second user interface, to disable selection of the travel products in the subset by the traveler;

prepare the second travel information relating to the travel products in the subset for transmission to the second user interface in the first display mode, the second travel information excluding the first travel information relating to the travel products that are not part of the subset;

after causing the second travel information relating to the travel products in the subset to be displayed on the second user interface in the first display mode, receive a second input from the travel agent defining a second display mode in which one or more of the travel products in the subset are selectable by the traveler;

in response to receiving the second input from the travel agent, cause one or more of the travel products in the subset to be unlocked on the second user interface for booking by the traveler;

after causing the one or more of the travel products in the subset to be unlocked on the second user interface for booking by the traveler, receive an input from the traveler indicative of a desire to book a selected one of the travel products in the subset; and in response to receiving the input from the traveler, book the selected one of the travel products.

12. The apparatus of claim 11 wherein the first travel information has a first format, and the instructions further cause the apparatus to:

reformat the first travel information from the first format to a second format, wherein the second travel information is caused to be displayed in the second format.

13. The apparatus of claim 12 wherein the first travel information is reformatted from the first format to the second format based on a template.

14. The apparatus of claim 13 wherein the second user interface is associated with a second computer, and the instructions further cause the apparatus to:

receive information indicative of a characteristic of the second computer; and configure the template based on the characteristic of the second computer.

15. The apparatus of claim 13 wherein the instructions further cause the apparatus to:

receive a profile of the traveler; and configure the template based on the profile.

16. A computer program product comprising:

a non-transitory computer readable storage medium; and instructions stored on the non-transitory computer readable storage medium that, when executed by a processor, cause the processor to:

display first travel information on a first user interface, the first travel information relating to a plurality of travel products;

receive first input defining a subset of the travel products selected by a travel agent for sharing with a traveler and a first display mode in which second travel information relating to the travel products in the subset is locked, when displayed on a second user interface, to disable selection of the travel products in the subset by the traveler;

prepare the second travel information relating to the travel products in the subset for transmission to the second user interface in the first display mode, the second travel information excluding the first travel information relating to the travel products that are not part of the subset;

after causing the second travel information relating to the travel products in the subset to be displayed on the second user interface in the first display mode, receive a second input from the travel agent defining a second display mode in which one or more of the travel products in the subset are selectable by the traveler;

in response to receiving the second input from the travel agent, cause one or more of the travel products in the subset to be unlocked on the second user interface for booking by the traveler;

after causing the one or more of the travel products in the subset to be unlocked on the second user interface for booking by the traveler, receive an input from the traveler indicative of a desire to book a selected one of the travel products in the subset; and in response to receiving the input from the traveler, book the selected one of the travel products.

* * * * *